United States Patent Office 3,499,262
Patented Mar. 10, 1970

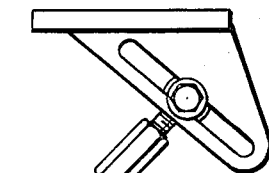
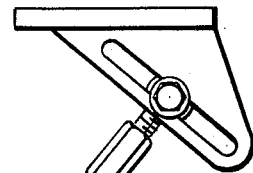
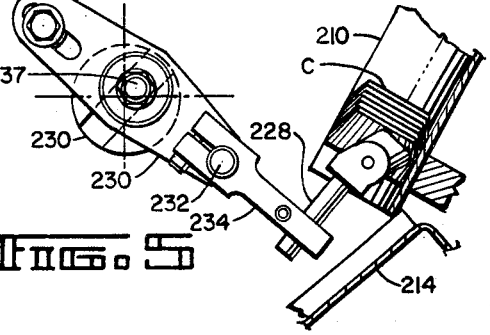
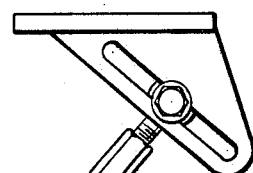
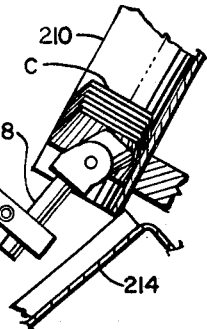
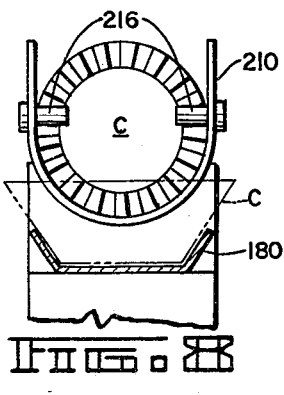

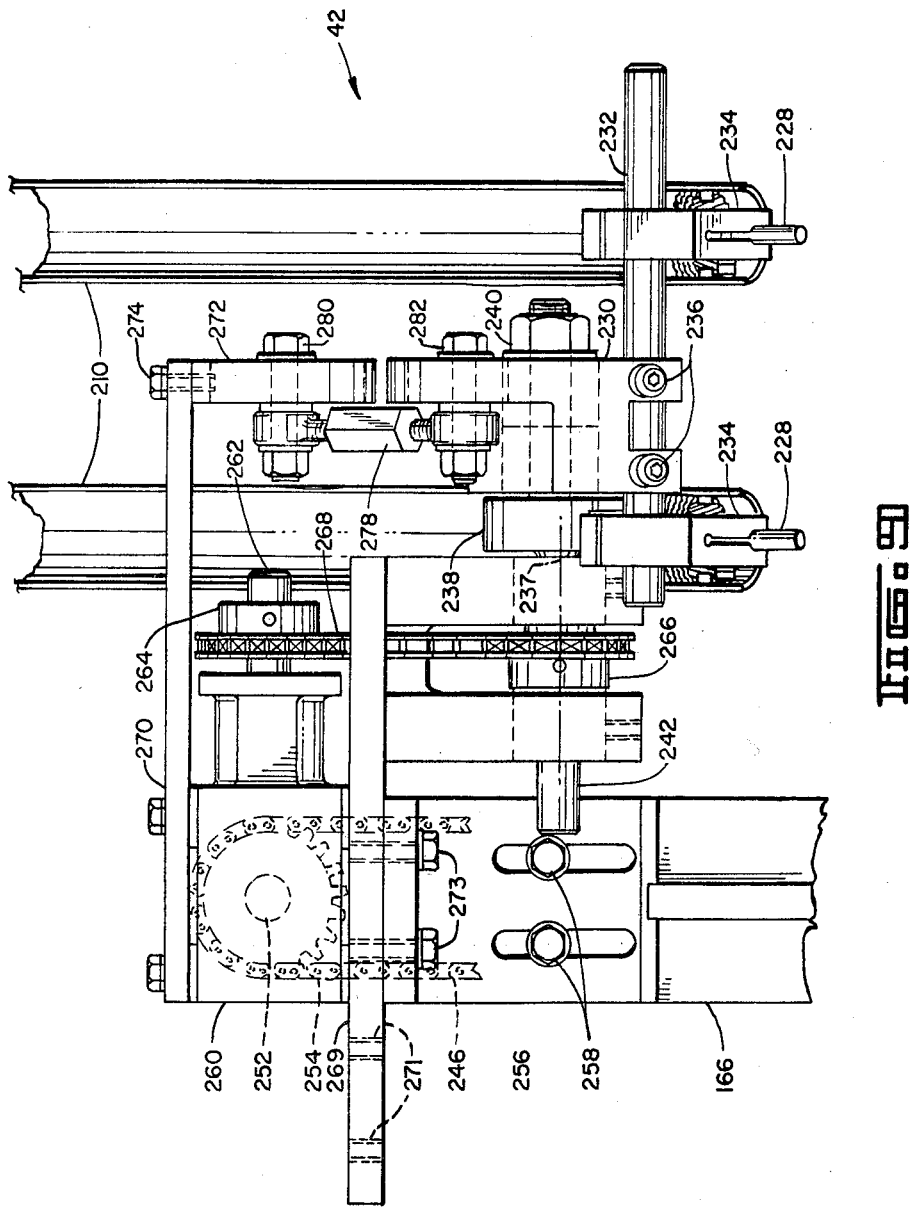

3,499,262
APPARATUS FOR PACKAGING CONFECTIONERY ARTICLES IN INDIVIDUAL RECEPTACLES AND GROUPING THE ARTICLES FOR TRANSFER INTO AN UPWARDLY OPEN BOX OR THE LIKE
Franklin J. Thurston, Hartford, and Joseph M. Nazali, West Hartford, Conn., assignors to Kaman Corporation, Bloomfield, Conn., a corporation of Connecticut
Continuation-in-part of application Ser. No. 595,447, Nov. 18, 1966. This application Feb. 14, 1968, Ser. No. 705,340
Int. Cl. B65b 5/08, 35/38, 43/44
U.S. Cl. 53—124
30 Claims

ABSTRACT OF THE DISCLOSURE

Two walking beam type conveyors are arranged side-by-side and are driven from a single drive means so that as one beam advances boxes therealong, the second beam is returning after having advanced groups of articles along it. Paper cups are fed onto the second conveyor at its upstream end by a dispensing apparatus which is driven from said single drive means. The articles are loaded either into the paper cups, or directly onto the second conveyor, by an apparatus which operates in timed step-by-step relationship with the second conveyor. A compacting device on the second conveyor compresses the articles and cups into appropriately sized groups and a transfer unit picks up each such group off said second conveyor and lowers the articles and cups into a box on said first conveyor. The transfer unit is driven by one of the conveyors and as a result of the 180° phase relationship between the two conveyors, each group is picked up off the second conveyor while the second beam is returning and lowered into a box on said first conveyor during return movement of the first conveyor beam.

---

This application is a continuation-in-part application of our copending application Ser. No. 595,447 filed Nov. 18, 1966.

BACKGROUND OF THE INVENTION

In our earlier application entitled "Article Packaging or Handling Apparatus," Ser. No. 595,447, filed Nov. 18, 1966, we disclosed an apparatus capable of automatically handling relatively large batches of articles of various size, of orienting such articles, and of feeding said articles individually to designated locations, such as the compartments of a box or tray, according to a particular predetermined pattern.

In the present disclosure, certain components of the present invention are carried over from the above-mentioned disclosure, and in addition, suitable components are provided for separating the articles in the boxes or trays by depositing at least some of said articles in individual receptacles, such as paper cups. Thus, the apparatus disclosed herein can be used to load articles into boxes which do not have individual compartments.

SUMMARY OF INVENTION

This invention relates to machines for packaging articles, such as candies or the like; and deals more particularly with an apparatus which is capable of loading articles into individual receptacles, such as crinkle type paper cups or the like, and then transferring groups of articles together with their associated receptacles into upwardly open receivers, such as boxes or pre-formed trays.

A general object of the present invention is to provide an apparatus for packaging confectionary articles in individual receptacles, such as paper cups or the like, and for grouping said articles together with their associated receptacles for transfer into upwardly open receivers, such as cardboard boxes or the like.

A further object of the present invention is to provide conveyors for said receivers and receptacles respectively which conveyors are mechanically interlocked so that they can be operated in timed relationship with one another by a single drive means.

A further object of the present invention is to provide dispensing apparatus for handling said article receptacles which apparatus is capable of placing said receptacles on a conveyor in timed relationship with the intermittent motion of said conveyor.

A further object of the present invention is to provide mechanism for compacting said articles and their associated receptacles into groups on one conveyor prior to transferring said grouped articles into receivers on a second conveyor.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

DESCRIPTION OF DRAWINGS

FIG. 2A is a side elevational view of a portion of the apparatus shown in FIG. 1 being taken along the line 2A—2A of the latter figure.

FIG. 2B is a horizontal sectional view taken along the line 2B—2B of FIG. 2.

FIG. 4 is an enlarged view of the crank arm shown in FIG. 3 with one of its associated paper cup engageable fingers for removing individual cups from a magazine in which said cups are stored.

FIG. 5 is a view similar to FIG. 4 showing the crank arm moved through 90° from the position shown in FIG. 4.

FIG. 6 is a view similar to FIGS. 4 and 5 showing the crank arm moved through another 90° from that shown in FIG. 5.

FIG. 7 is a view similar to FIGS. 4, 5, and 6 showing the crank arm rotated through still another 90° with respect to FIG. 6.

FIG. 8 is a sectional view of one magazine, being taken along the line 8—8 of FIG. 4.

FIG. 8A is an enlarged view of the finger shown in FIG. 8 with portions thereof broken away for clarity.

FIG. 9 is a vertical sectional view taken along the line 9—9 of FIG. 3.

DETAILED DESCRIPTION

Figure 1:
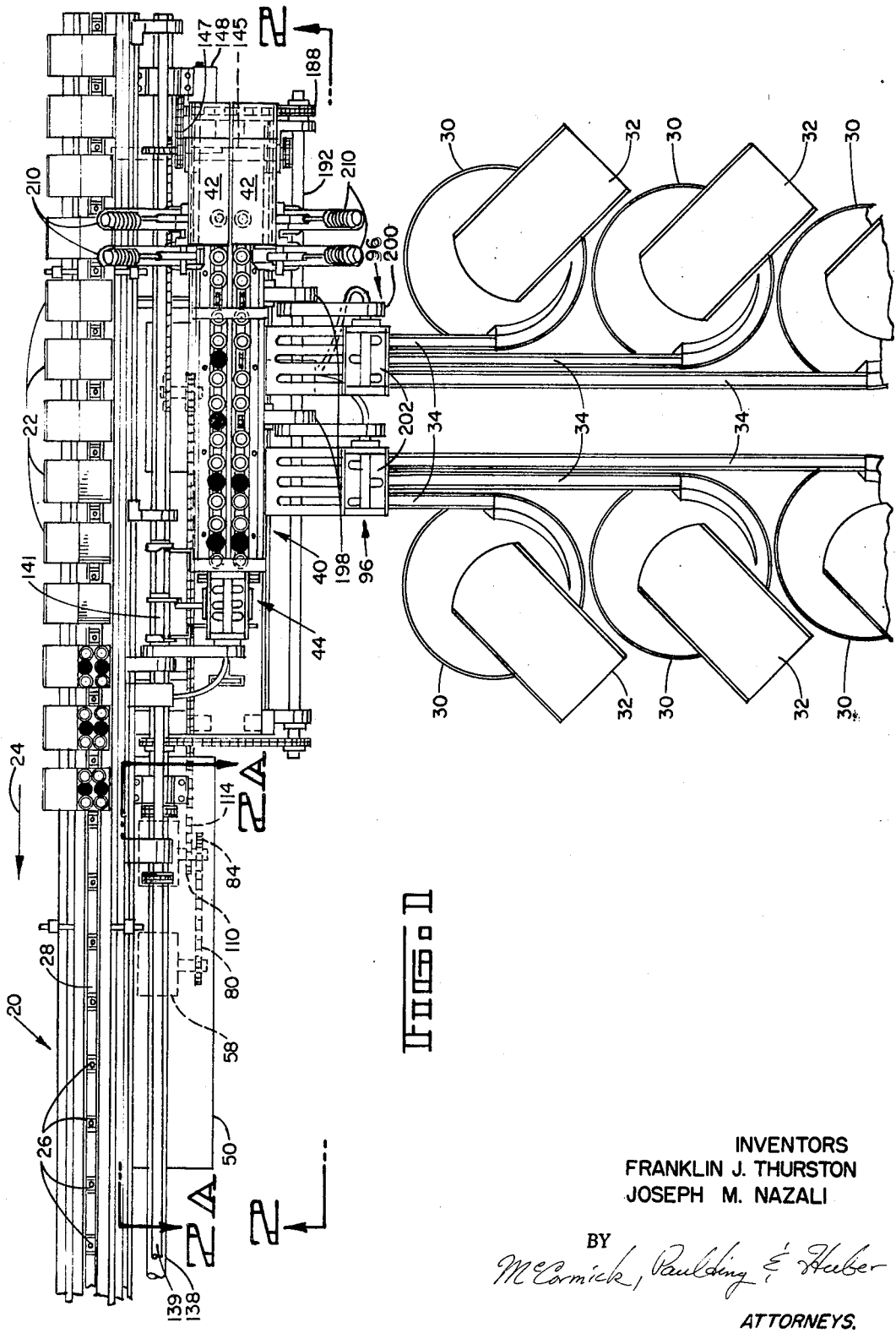
FIG. 1 is an overall plan view of an apparatus for packaging confectionery articles in individual receptacles, and for grouping the articles for transfer into upwardly opened boxes.

Turning now to the drawings in greater detail, FIG. 1 shows an apparatus for packaging confectionery articles in upwardly opened receivers or boxes. The apparatus illustrated includes a first conveyor 20 upon which a plurality of receivers 22, 22 are conveyed from right to left in an intermittent fashion, the direction of movement being indicated by the arrow 24. The box conveyor 20 is generally similar to the conveyor described in the above-mentioned patent application and includes a plurality of pushers 26, 26 which are mounted in longitudinally spaced relation on a walking beam 28. The boxes 22, 22 are slidably received on the upwardly facing top surface of a fixed framework associated with the conveyor 20, and suitable mechanism is provided for advancing the beam 28 in the direction of the arrow 24 and for lowering the beam and returning the same to an initial position so as to successively advance all of the boxes 22, 22 in the direction of the arrow 24 in step-by-step fashion.

In the present case, the receivers are shown to be boxes having hinged covers which can be folded downwardly to close the box by a suitable plow, or other suitable means (not shown) mounted at the downstream end of the conveyor 20. As shown, the boxes 22, 22 are not provided with compartments for the candy articles and it is a feature of the present invention that means is provided for depositing at least some of the candy articles in individual receptacles, such as paper cups, prior to loading the articles into the boxes.

As in our above-mentioned, earlier filed patent application, means is provided for handling candy articles of various sizes and shapes and orienting the same prior to transferring said articles into either individual receptacles as in the present invention or into compartmentalized receivers as in our earlier patent application. Preferably, and as shown in FIG. 1, said means comprises a plurality of vibratory feeder bowls 30, 30 each of which is mounted on an individual pedestal for vibratory motion so as to feed articles therearound. Each bowl 30 has a vibrating tray 32 associated therewith and it will be apparent that batches of candies to be packed can be placed on the trays 32, 32 with each tray receiveing candies which are identical to one another. That is, candies of one kind are, or may be loaded on one tray 32, and candies of another kind are, or may be loaded onto another tray 32. It should also be understood that the candies are placed, by the machine operator, onto the trays from flats so that the candies rest on their bottom surfaces when received by the trays 32, 32. As so loaded there is no problem of orienting the candies to turn up the proper side. Each tray 32 is inclined, as described in the above-mentioned patent application, and is vibrated linearly so as to feed the candies placed thereon into the sub-adjacent feeder bowl 30 at a controlled rate. Each feeder bowl 30 has a chute 34 associated therewith for delivering the candies from each feeder bowl to an associated loading station. Each such chute 34 is inclined, as described in the above-mentioned patent application, with its upper end adapted to receive candies from the feeder bowl through a gate in the bowl's periphery.

In accordance with the present invention, a second conveyor, indicated generally at 40, is provided alongside the first, or box conveyor 20, for receiving articles transferred thereto from the loading stations mentioned above. Transfer means 96, 96 is provided alongside the second conveyor 40 for picking up articles from the loading stations and depositing the same upon said second conveyor, and additional transfer means 44 is provided adjacent the downstream end of the second conveyor 40 for picking up said articles and transferring the same into an awaiting box 22 on the first conveyor 20. These transfer means are similar to those disclosed in our above-mentioned patent application.

In further accordance with the present invention, a pair of paper cup dispensing apparatus, indicated generally at 42, 42 are provided adjacent the upstream end of the conveyor 40 so that at least some of the articles transferred onto the second conveyor 40 are deposited in individual paper cups. In addition, means to be described hereinbelow is provided adjacent the downstream end of the second conveyor 40 for compacting said articles, and their associated paper cups, into distinct groups prior to being transferred into the awaiting boxes on the first conveyor 20.

Turning now to a more detailed description of the two conveyors 20 and 40, and more particularly to the means for operating these conveyors in timed relationship with one another, a rectangular enclosure 50 is provided below the conveyor 20, downstream of the conveyor 40, which enclosure houses drive means for operating each of the conveyors 20 and 40 in the following manner.

Figure 2:
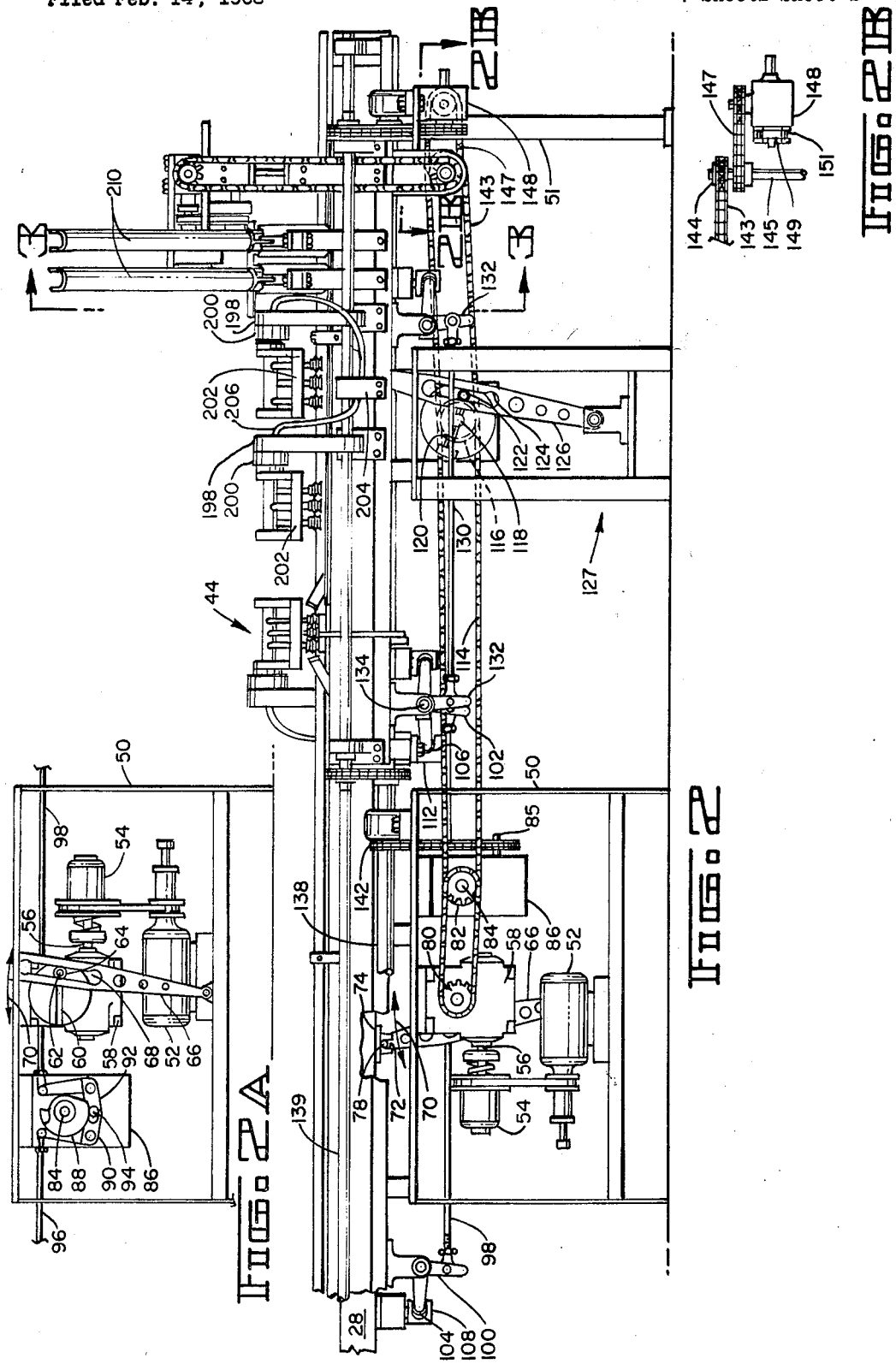
FIG. 2 is a side elevational view of the apparatus shown in FIG. 1 taken along the line 2—2 of that figure.

Although the first, or box conveyor 20, is adequately shown and described in the above-mentioned patent application, its essential features will now be summarized with reference to FIGS. 2 and 2A of the drawings herein. An electric motor 52 is connected through a variable speed drive device 54 to the input shaft 56 of a speed reducing unit 58. As best shown in FIG. 2A, the speed reducing unit 58 has an output shaft upon which is mounted a crank 60 having an eccentrically mounted stud 62. A roller 64 is mounted on the stud 62 and the roller is radially adjustable to vary its radial displacement from the axis of the output shaft. A generally vertically arranged lever 66 is pivotally supported at its lower end in the framework of the enclosure 50, and the lever includes an elongated slot 68 in which the stud 62 and its roller 64 are received so that rotation of the crank 60 causes the lever 66 to oscillate back and forth in the direction of the arrow 70. The free, or upper end of the lever 66, is received in a suitable vertically elongated slot or socket 72 provided in a depending block 74 fixed to the beam 28 of the first conveyor 20. A stud fixed to the upper end of the lever 66 carries a roller 78 for engagement with the walls of the slot or socket 72. It will thus be apparent that rotation of the crank 60 causes longitudinal reciprocatory movement of the beam 76 as a result of the driving action of the lever 66 working on the block 74. It will also be apparent that by adjusting the radial displacement, or eccentricity of the stud 62, on the crank 60 the amplitude of the reciprocatory movement of the beam 76 may be readily varied.

The output shaft of the speed reducing unit 58 also extends through the opposite side of said unit, as shown in FIG. 2, and carries a sprocket 80, which sprocket has a chain and entrained therearound and around a second sprocket 82 so that input shaft 84 is rotated whenever the speed reducing output shaft is rotated. The shaft 84 comprises an input shaft for a barrel cam unit 86. The barrel cam unit 86 has a cam 88 mounted on the opposite end of its shaft 84, as best shown in FIG. 2A. Right hand, and left hand bell cranks, 90 and 92 respectively, are pivotally mounted on the cam unit with one arm on the right hand bell crank carrying a cam follower 94 for engaging the periphery of the cam 88. The bell cranks 90 and 92 are connected to one another so that each moves in unison with the other and in opposite directions. The upwardly extending arm of each bell crank 90 and 92 is connected to a push rod, 96 and 98 respectively, which push rods extend longitudinally beneath the first conveyor and through the sidewalls of the enclosure 50 as best shown in FIG. 2A. The push rods, 96 and 98, are connected to depending bell crank arms pivotally supported below the conveyor platform as shown at 100 and 102 respectively. The upper, generally horizontally extending arms of the bell cranks 100 and 102, carry rollers 104 and 106 respectively, which rollers are received in sockets defined by the lower end portions of yoke member 108 and 112 respectively. Each yoke member 108 and 112 is generally similar to the yoke member 152 shown in FIG. 3 and has an upwardly extending bifurcated end portion, each bifurcation of which carries a pair of rollers, and which rollers engage upwardly and downwardly facing flanges of a pair of channels extending along the beam 28 of the first conveyor 20. As so constructed the beam is free to move longitudinally relative to the yoke members, 108 and 112, while at the same time being restrained to move vertically therewith. Each yoke member is slidably supported for vertical movement in depending bearing blocks similar to that shown in FIG. 3 with reference to the bearing block 153 associated with the second conveyor 40.

Considering next the means for operating the second conveyor 40, the above mentioned shaft 84 associated with the barrel cam unit 86 also carries a second sprocket 110 having a chain 114 entrained therearound and also around a sprocket 116 located generally intermediate the length of the second conveyor 40. The sprocket 116 is carried on a shaft 118 which is similar to the output shaft of the speed reducing unit 58 described hereinabove with reference to the first conveyor 20. More particularly, the shaft 118 carries a crank 120 upon which is mounted an eccentric stud 122 having a roller which is adapted to ride in a slot 124 defined in a second lever 126 generally similar to the lever 66 described hereinabove with reference to the first conveyor 20.

The second lever 126 is pivotally connected to its lower end portion to a fixed support 127 for the second conveyor. The lever 126 carries a roller at its upper end which engages the sides of a slot or socket (not shown) provided in a depending block fixed to the beam associated with the second conveyor. As best shown in FIG. 2, the levers, 66 and 126, associated with the first and second conveyors, 20 and 40 respectively, are arranged in opposite positions relative to one another so that the beams 28 and 150 associated with these conveyors operate 180° out of phase with one another.

As mentioned hereinabove, the up and down, or vertical movement of the beam 28 associated with the first conveyor 20 is achieved by the longitudinal reciprocations of the push rods 96 and 98. A push rod 130 associated with the second conveyor 40 (best shown in FIG. 2) is connected at either end to the depending arms respectively of a pair of bell cranks 132, 132 each of which is pivotally supported in a depending block mounted to the fixed frame of the second conveyor 40. The upstream bell crank 106 associated with the first conveyor is carried on the same shaft 134 as the downstream bell crank 132 associated with the second conveyor 40. Each of these bell cranks 106 and 132 have their horizontally extending arms arranged in opposite directions so as to move oppositely with respect to one another in response to rotation of the shaft 134. It will thus be seen that not only is the horizontal advance and return movement of each of the conveyor beams 28 and 150 180° out of phase but the up and down or vertical movement of each of these beams also occurs 180° out of phase with one another as a result of the arrangement of the bell cranks 106 and 132 on the shaft 134.

To summarize as the beam 28 associated with the first conveyor 20 advances to convey boxes 22, 22 along the first conveyor, the second conveyor beam 150 is being returned with its pushers located below the upwardly facing top surface of the second conveyor 40. Further, as the pushers 26, 26 associated with the first conveyor are retracted below its top surface, the pushers associated with the second conveyor are advanced to feed paper cups or articles to be packed therealong.

While the specific construction of the first conveyor 20 is adequately shown and described in the above mentioned patent application, certain features of its construction will be summarized herein. As mentioned herein-above, a rectangular enclosure 50 supports the first conveyor 20 generally intermediate its ends as shown in FIG. 2, with an upright post or standard 51 being provided adjacent the right hand end of the first conveyor 20. At least one longitudinally extending, oscillating shaft 138 is provided alongside the first conveyor 20. Two such shafts are preferably provided in an elongated walking beam type conveyor of the type shown in FIGS. 1 and 2, to reduce the torsional twisting increment or "wrap-up" of an elongated shaft between the point at which such shaft is driven and various power takeoffs used with said shaft. As shown in FIG. 2, the lower shaft 138 is the larger of the two and is driven through a chain and sprocket mechanism indicated generally at 142 from a secondary output shaft 85 associated with the barrel cam unit 86. This output shaft 85 oscillates the longitudinally extending shaft 138, and an adjacent shaft 139, through substantially 180° with dwell periods associated with its extremities of travel. In the embodiment shown, the longitudinally extending shaft 138 is used to operate the article transferring 144 for picking up articles on the second conveyor 40 and transferring the same into the boxes 22, 22 on the first conveyor 20, and it will be apparent that the oscillating shaft 138 might be used for other purposes.

While the secondary shaft 139 might extend coextensively with respect to shaft 138, alongside the conveyor 20, in the embodiment shown a continuously rotating shaft 141 is preferably provided between the two conveyors 20 and 40 for operating article, compacting means to be described in greater detail hereinbelow. To drive the shaft 141 a chain 143 is entrained over a sprocket on shaft 118 and over a sprocket 144 located on a cross-shaft 145 rotatably supported below the upstream end of the second conveyor 40. An additional sprocket 146 on the cross-shaft 145 carries a chain 147 which drives the input shaft of a right angle drive unit 148. One output shaft associated with the unit 148 carries a sprocket 149 which is drivingly connected to the shaft 141 through a short vertically disposed chain 151 best shown in FIG. 2B.

Figure 3:
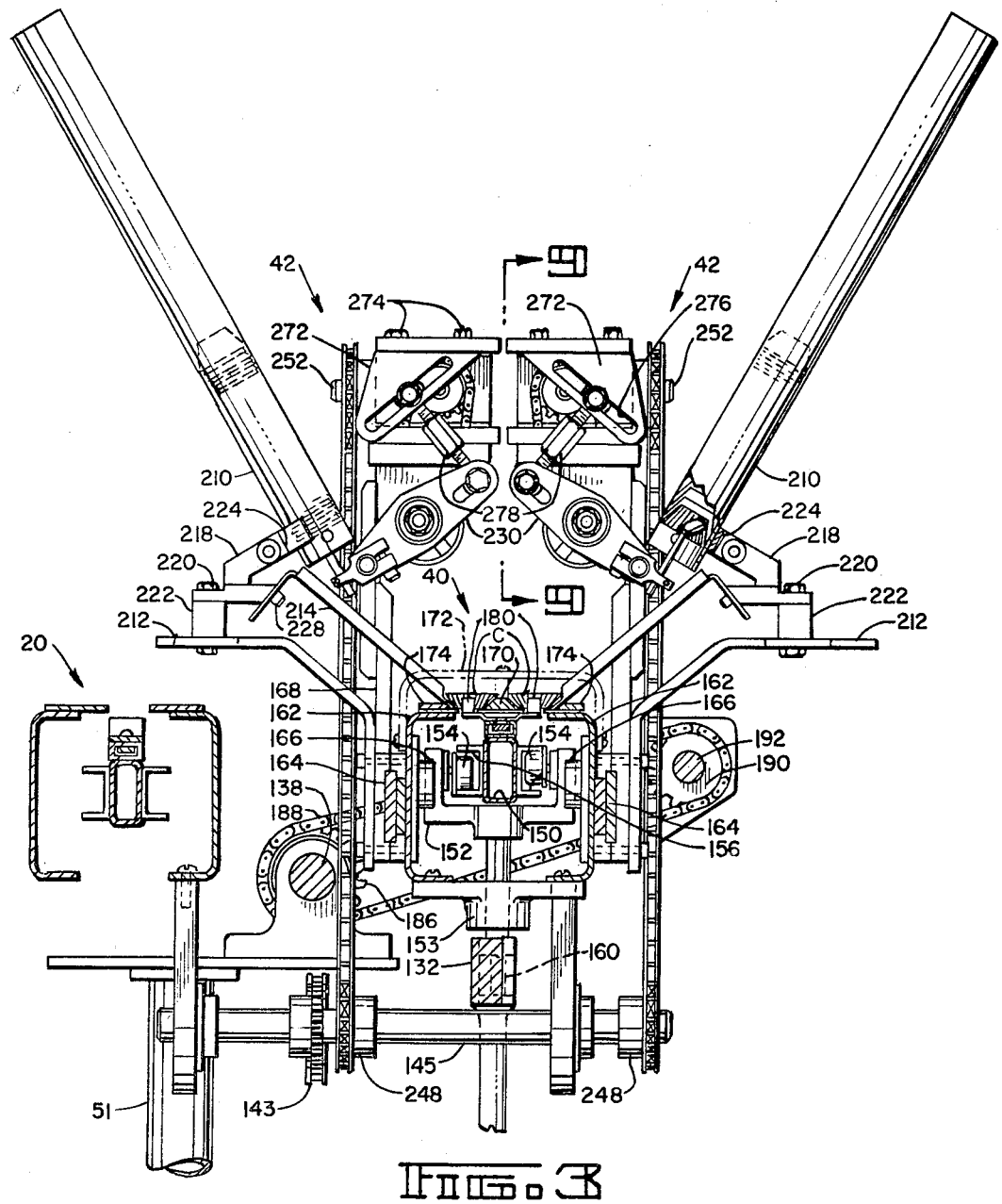
FIG. 3 is an enlarged vertical sectional view taken on the line 3—3 of FIG. 2 showing the paper cup conveyor, and the apparatus for dispensing the paper cups and placing them in side-by-side relationship on said conveyor.

Turning now to a more detailed description of the second conveyor 40, the walking beam 150 associated therewith is shown to best advantage in FIG. 3 as comprising a hollow box beam having channel segments 156, 156 attached to its vertically extending sides to receive the rollers associated with the bifurcated posts or yokes 152, 152 (one shown) which raise and lower said beam 150 without interfering with the longitudinal back and forth motion thereof. One such post or yoke mamber 152 is shown in FIG. 3 with rollers 154, 154 provided on each of its bifurcations. The rollers 154, 154 are received in the channel segments 156, 156, The bell crank 132 for raising and lowering the post or yoke 152 carries a roller 160 which is received in a socket defined for this purpose in the lower end of the post or yoke 152 in a manner similar to that described hereinabove with reference to the first conveyor 20. The second conveyor 40 further includes a fixed platform comprising longitudinally extending channels 162, 162 each of which has its respective flanges arranged facing inwardly toward one another. Each channel web carries a T-shaped key way 164, 164 along its outer surface. Preferably, and as shown in FIG. 3, fixed guides or ways 166, 166 are provided on the inside surface of each of the channels 162, 162 to slidably receive the bifurcations of the yoke or post 152.

Still with reference to FIG. 3, and to the second conveyor 40, it will be seen that two article dispensing apparatus 42, 42 are provided one on either side of the second conveyor 40. Each dispensing apparatus 42 is mounted on an upright stanchion 168, which stanchion is clamped to an associated key way 164. Each dispensing apparatus is operable to deposit a pair of individual article receptacles, such as the paper cups indicated generally at c, c on the upwardly facing top surface of the second conveyor 40. The top surface of the second conveyor 40 is adapted to receive said paper cups in an upright condition is shown, in side by side parallel paths or tracks defined in the second conveyor 40 so that the receptacles c, c can be conveyed therealong by pushers associated with the beam 150. The inwardly facing top flanges of the channels 162, 162, cooperate to define a single slot extending the full length of the second conveyor 40. A longitudinally extending median strip 170 is provided intermediate these inwardly extending flanges 167, 167 and is held in place by a plurality of bridge members 172, 172 which are attached to the web portions of the fixed channel members 162, 162 and which bridge members extend laterally across the upwardly facing top surface of the conveyor 40 so as to support the median strip 170 in the position shown. The median strip 170 is generally tapered in cross section to receive the inclined sides of the paper cup, and a lower edge of the strip 170 receives the bottom edge of the paper cup. Marginal strips 174, 174 are attached to the upper surfaces of the channel flanges and these strips 174, 174 cooperate therewith to define an inwardly extending edge for receiving the opposite bottom edge of the paper cups c, c. As so constructed, paper cups can be supported in each of the paths or tracks provided for this purpose on the second conveyor 40.

Figure 10:
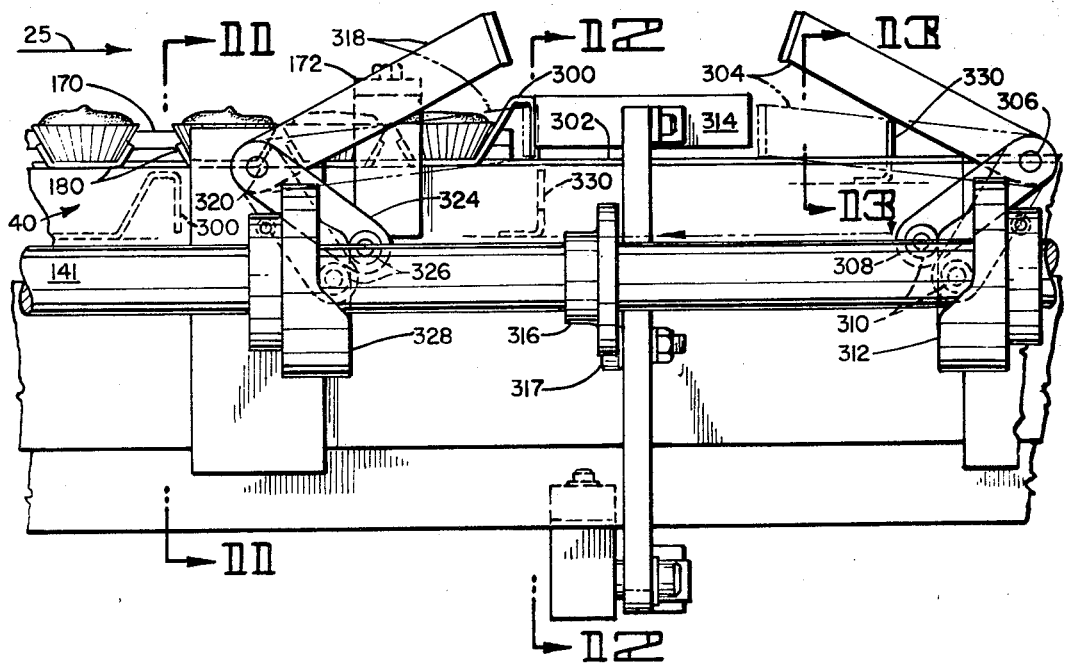
FIG. 10 is an enlarged side elevational view of a portion of the conveyor for the paper cups, showing the mechanism for compacting the articles and their associated paper cups on the paper cup conveyor.
Figure 11:
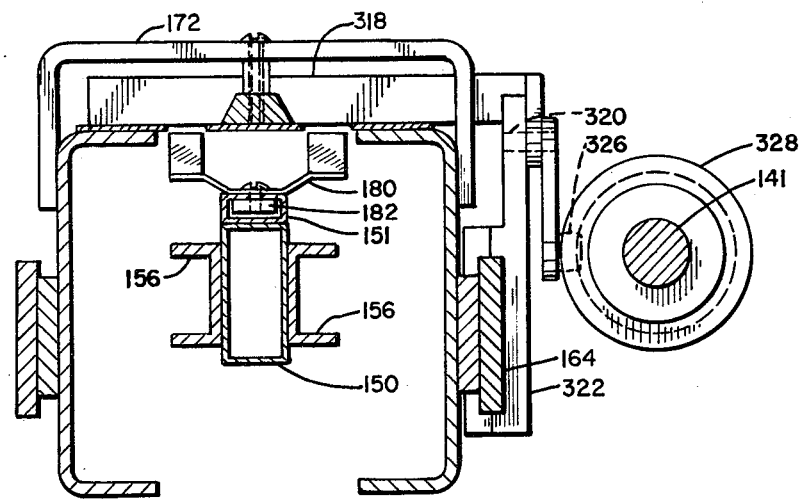
FIG. 11 is a vertical sectional view taken along the line 11—11 of FIG. 10.

Considering next the pushers 180, 180 mounted on the walking beam 150, one such pusher, best shown in FIG. 11, comprises a bifurcated member which is clamped to an upper member 151 of the walking beam 150 at its mid point and has laterally outwardly extending arms. The arms of the pushers terminate in forwardly and rearwardly spaced tabs, best shown in FIG. 10, which tabs engage the forward and trailing side edges respectively of the paper cups c, c. Preferably and as shown in FIG. 3, each of the paper cup pushers 180, is releasably clamped to the beam member 151 by screws, each of which screws passes through a respective one of the pushers 180 and is threaded into an associated nut 182. The nut 182 is in turn slidably received in and held captive by, the hollow member 151. As so constructed, each of the pusher members 180, 180 serves to advance the paper cups c, c in defined increments and in the downstream direction along the conveyor 40. The pusher tabs then retract below the upper surface of the conveyor 40 as shown in FIG. 11 so as to be returned to initial positions below that shown in FIG. 3. The pusher tabs are then raised to the position shown in FIG. 3 so as to advance a succeeding pair of paper cups c, c along the conveyor 40.

The longitudinally extending oscillating shaft 138 associated with the first conveyor 20 and driven by the common drive means associated with both conveyors 20 and 40, carries a sprocket 186, best shown in FIG. 3, on which is entrained a chain 188 which extends transversely across the upstream end of the conveyor 40 and around a second sprocket 190 carried by a second oscillating shaft 192 associated with the second conveyor 40. An identical chain and sprocket connection is provided at the downstream end of the shaft 192 so that the shaft 192 oscillates through substantially 180° with dwell periods at the extrtmities of its angular travel in the same manner as outlined hereinabove with reference to the shaft 138. The oscillating shaft 192 associated with the second conveyor 40 serves to oscillate the article transfer units 96, 96 between the positions shown in FIG. 1 wherein they are arranged over the lower ends of the chutes 34, 34 to positions over the second conveyor 40 wherein the articles picked up by the transfer units are deposited in paper cups on the second conveyor 40. The specific construction of each transfer unit 96 and its mode of operation is adequately described in the above mentioned joint patent application and need not be described in detail herein. By way of summary, however, it is noted that each transfer unit comprises an upright arm or link 198 which is adjustably mounted above the driven shaft 192 and carries two sprockets at its upper end, one of which sprockets is drivingly connected to the shaft through a chain and still another sprocket fixed to the shaft 192.

A cross arm 200, as shown in FIG. 1, is fixed to a short shaft mounted in the upper end of the upright arm 198 for movement between the positions shown to positions over the second conveyor 40. A transfer head 202 is rotatably supported at the free end of the cross arm 200 by means of a hollow shaft, and a sprocket is fixed to the head and is driven by a chain trained thereover and also over the second sprocket on the link 198. Therefore, as the shaft 192 oscillates, the cross arm swings relative to the vertical arm, and the head rotates relative to the cross arm to keep the head 202 from rotating from its true vertical orientation. The hollow shaft associated with the transfer head is connected to the outlet of a valve body or block 204, best shown in FIG. 2, by a flexible line 206. The valve block 204 is supported on the key way 164 and the interior of the valve body 204 communicates with a source of vacuum pressure (not shown). Movement of the oscillating shaft 192 moves a valve element (not shown) in the valve block to provide a source of vacuum pressure at each of the article pickup units mounted on the transfer head 202. The vacuum pressure at the transfer head is so regulated by the valve element that articles in the chutes 34, 34 can be picked up by the transfer unit and released over the second conveyor 40 in timed relationship with movement of the transfer head.

In the embodiment shown, three chutes 34, 34 feed candies to each of the transfer units 202, 202 so that six candies are arranged in groups on the second conveyor 40. The transfer unit 44 for picking up groups of candies from the second conveyor 40 and depositing same on the first conveyor 20 is generally similar in construction to the units 96, 96 just described except that the unit 44 is adapted to pick up six candies in a compact group for depositing the same in the upwardly opened containers or boxes 22, 22 on the first conveyor 20. The transfer unit 44 is driven by the oscillating shaft 139 associated with the first conveyor, and a valve block 145 associated therewith provides a source of vacuum pressure to the transfer unit 44 for the six pickup units associated with the transfer head of the unit 44.

Turning now to a more detailed description of the paper cup dispensing apparatus 42, two such units are depicted in FIG. 3 mounted at the left and right hand sides respectively of the second conveyor 40 on the stanchions 166, 166 mentioned previously. Each paper cup dispensing apparatus or unit comprises a pair of side-by-side cup magazines 210, 210 supported at either side of the conveyor 40 on angle brackets 212, 212, which angle brackets are adjustably positioned on the key way 164, 164. Means is provided, and will be described hereinbelow, for withdrawing the lowermost receptacle or cup c from said magazine 210 in timed relationship with the step-by-step motion of the conveyor 40. Chute means 214 is provided in association with each of the magazines 210 for guiding each cup c into a path or track on the conveyor 40.

Each magazine 210, 210 comprises a channel shaped member which is inclined slightly with respect to the vertical and extends outwardly away from the center line of the second conveyor 40 as best shown in FIG. 3. The open side of the channel faces toward the conveyor so that paper cups can be inserted therein in stacked relationship, and in an inverted position, with the lowermost cup c resting against two inwardly extending studs 216, 216 provided for this purpose adjacent the lower end of the magazine 210. Each magazine 210 is held in position on the angle bracket 212 by an adjustable brace 218 which is bolted to the angle bracket 212 by a screw 220. A spacer 22 is provided in order to adjust the vertical height of the magazine 210 above the upwardly facing top surface of the conveyor 40. The bracket 218 includes a pivotally mounted upper arm 224 which is secured to the magazine 210 to permit angular adjustments of the magazine with respect to the vertical.

As mentioned hereinabove each magazine has associated therewith an individual chute 214 which is also supported from the bracket 218 by a screw 228. Each chute 214 is also generally channel shaped in cross section so that the lowermost cup, after it is withdrawn from the magazine and rotated to a generally upright position, can slide down the chute 214 by gravity, and onto the proper path or track on the upwardly facing top surface of the conveyor 40. The lower end of each 214 rests against the marginal guide strip 174 to assure that the cup c is positioned in one of the tracks provided therefor in the conveyor 40. It will also be apparent that the chute 214 deposits the cup c in such a position that the cup pusher 180, and more particularly the upwardly extending rear tabs thereof engages the trailing side of the cups c, c so as to move the same longitudinally along the conveyor 40 in step-by-step fashion as described hereinabove.

Turning now to a more detailed description of the means for withdrawing the lowermost cup c from each of the magazines in timed relationship with the step-by-step motion of the conveyor 40, FIGS. 4 through 7 inclusively show a cup engageable finger 228 which is mounted on a crank arm 230 so as to be movable upwardly into the magazine 210 and downwardly along one side of the magazine to successively withdraw inverted cups 6, 6 from the magazine, and to rotate the cup so withdrawn toward the upright position desired for transfer down the chute 214 in generally timed relationship with the step-by-step motion of the conveyor 40.

While the cup engageable finger 228 may comprise a unitary post having a pad of frictional material at its upper end for engaging the cup to be withdrawn, it has been found that a spring loaded finger construction such as that shown in FIG. 8A possesses advantages over the use of such a unitary post. The finger 228 comprises a hollow tube in which a plug 229 is slidably received for movement between the position shown in FIG. 8A and an extended position. A tension spring 227 urges the plug toward the positon shown. The hollow member 228 includes ears 225, 225 which carry a pin 231 on which the cup engageable pad 233 is pivotally received. The plug 229 includes a shoe portion 235 which normally engages the pad 233 to urge the same toward the position shown. However, as the pad 233 engages the cup for withdrawal, as shown in FIG. 6, the pad is pivoted about the pin 231 and said pad thereby engages a larger area of the cup for permitting a more positive withdrawing action. It will be apparent that the pad is returned to its normal position as it clears the end of the magazine by the action of the return spring 227. Since the cup being withdrawn must be deformed slightly as it is pulled past the studs 216, 216 the above described finger construction has been found to provide a very positive and predictable friction force on each cup being withdrawn. Preferably, and as best shown in FIGS. 5, 3 and 9, one such crank arm 230 is provided on either side of the conveyor 40 and may have a plurality of cup engageable fingers mounted thereto in an adjustable manner on the bar or shaft 232. As best shown in FIG. 9 each finger 228 is clamped in a supporting arm 234 which supporting arm is adjustably clamped to the bar 232. The bar 232 is in turn adjustably mounted to the crank arm 230 by screws 236, 236. Each crank arm 230 is mounted on an eccentric unit 238, which eccentric unit 238 includes provision for adjusting the radial position of the crank arm 230 with respect to the axis of rotation 237 of the eccentric unit 238, a clamping nut 240 being provided to lock the crank arm 230 in any desired radial relation to the units axis of rotation. The eccentric unit 238 is carried on a stub shaft 242, which is rotatably mounted in a fixed framework supported on the stanchion 166. Thus the stub shaft 242 rotates about an axis parallel to the direction of movement of the paper cups c, c along the second conveyor 40.

A continuously driven chain and sprocket mechanism is provided for rotating the stub shaft 242 directly from the drive means associated with advancing and return movement of the beam associated with the second conveyor 40. The chain and sprocket mechanism includes a pair of continuously driven chains 246, 246 entrained on a pair of sprockets 248, 248 associated with the lower cross shaft 145 located generally below the upstream end of the conveyor 40 as best shown in FIG. 3. A pair of second cross shafts 252, 252 are provided above the upstream end of the second conveyor 40, and sprockets at either end of the respective cross shafts 252, 252 are continuously driven by the chains 246, 246.

The fixed frame associated with each cup dispensing unit 42 comprises an angle bracket having a depending leg 256 which is adjustably clamped to the stanchion 166. A horizontally extending plate 269 is mounted to the angle bracket by screws 273, 273. A right angle drive 260 is mounted on the plate 269 and its input shaft comprises the upper cross shaft 252. The output shaft 262 of the unit 260 is driven in a one to one relationship with rotation of the cross shaft 252. A chain 268 is entrained over a sprocket 264 associated with the gear box output shaft 262 and over a sprocket 266 associated with the stub shaft 252 for rotating the eccentric unit 238.

The fixed frame of the cup dispensing apparatus 42 further includes a generally horizontal upper plate 270 which is parallel to the plate 269 and extends longitudinally in the upstream direction with respect to the conveyor 40. A depending bracket 272 is secured to the upstream end of the plate 270 by screws 274, 274. The depending bracket 272 is slotted as best shown at 276 in FIG. 3 to adjustably receive the upper end of a link 278, which link is connected at its lower end to the crank arm 230. The link 278 is adjustable in length having left and right hand end fittings which are adapted to be releasably clamped to the depending bracket 272 and to the slotted upper end of the arm 230 by machine screws 280 and 282 respectively. As so constructed the link comprises a restraining means for the crank arm 230 to assure that the fingers 228, 228 associated with the opposite end of the crank arm 230 move generally upwardly into the magazines 210, 210 and laterally outwardly toward the wall of the magazines to engage the lowermost cups and thence downwardly to slide the cups out of the magazines, deforming the cups slightly as they pass beyond the studs 216, 216. The cup engageable fingers 228, 228 then release the cups c, c as best shown in FIG. 7 to again move upwardly into the lower end of the magazines 210, 210 for withdrawing the next succeeding pair of cups therefrom.

Turning now to a more detailed description of the means for compacting articles, together with their associated paper cups, adjacent the downstream end of the second conveyor 40, FIGS. 10 through 14, inclusively, illustrate a presently preferred form of such means. The downstream end portion of the second conveyor 40 is shown in FIG. 10 with the various pushers 180, 180 mounted on the beam 150. The pushers are in their raised positions wherein they are adapted to carry paper cups c, c together with their associated candies in groups of three, and in step-by-step fashion in the direction of the arrow 25. The fixed or central median guide strip 170 is shown, but the right-hand guide rail 174 is omitted in order to better reveal the pushers. The bridge structure of supporting the central median guide strip 170 is shown at 172. The continuously driven rotary shaft 141 which extends alongside the conveyor 40, generally between the first and second conveyors 20 and 40 respectively, is also shown in FIG. 10 and three separate cam means are mounted thereon as indicated at 328, 316 and 312.

In accordance with the present invention, the pusher 180 furthest downstream is provided with a forwardly protruding tab 300, which tab moves downwardly from the position shown in full lines, and rearwardly to the position shown in broken lines, after which said tab moves upwardly and forwardly in the direction of the arrow 25 to advance three candies together with their associated paper cups onto a deadplate 302, where they are compressed or compacted against movable stop means to be described.

Preferably, said stop means comprises a stop gate 304, pivotally mounted to the conveyor frame for movement about the fixed axis 306, between the inactive position shown in full lines, and the lowered or stop position shown in broken lines in FIG. 10. It will be apparent that in the lowered, or stop position, the stop gate 304 serves as a convenient abutment against which the articles and crinkle cups can be longitudinally compacted by the pusher tab 300 just described. The gate 304 comprises an L-shaped member having one leg extending laterally across the conveyor 40, and having its other leg pivotally mounted for movement about the axis 306. A depending arm 308 carried by the gate 304 carries a cam follower 310 at its lower end, which cam follower engages the surface of the cam 312 carried by the rotary shaft 141. Thus rotation of the shaft 141 causes the stop gate 304 to be raised and lowered in timed relationship with motion of the walking beam 150 associated with the second conveyor 40.

Pressure plates 314, 314 are provided at either side of the articles being compacted against the stop gate 304 to guide the articles as they are being compressed longitudinally by the pusher tab 300. These pressure plates 314, 314 are moved laterally toward one another through a second cam 316 carried by the shaft 141, which cam 316 engages a cam follower 326 to compress these articles and cups in the lateral direction on the deadplate 202 in a manner to be described in greater detail hereinbelow.

Since the cups c, c commonly referred to as crinkle cups, have a high degree of inherent resiliency, means is provided for maintaining the cups in the longitudinally compacted position referred to above. As the beam 150, and the pusher tab 300, are lowered out of engagement with said cups means is provided for retaining the cups in compacted relation between the plates 314, 314. As shown in FIG. 11, said means comprises a gate 318 movably mounted above the path of movement of the paper cups, and the articles associated therewith. The gate 318 is generally L-shaped having one leg which extends laterally across the conveyor 40 and a second leg which is pivotally connected to the fixed frame of the conveyor for movement about a fixed pivot axis 320. The axis 321, like the axis 306 associated with the stop gate 304, is defined by a fixed pivot pin which is held in place at the side of the conveyor on an upright post such as the post indicated at 322. The post 322 is releasably clamped to the key way 164 on the conveyor 40. A depending arm 324 associated with the L-shaped gate 318 carries a cam follower roller 326, which roller engages the face of a rotary cam 328 generally similar to the cam 312 associated with the stop gate 304. These cams 312 and 328 are so oriented, angularly, on the shaft 141 that the stop gate 304 is lowered prior to the gate 318, the gate 318 being lowered as the pusher tab 300 is lowered by the beam 150. It will be apparent that these gates 304 and 318, may be raised substantially simultaneously after the articles, and associated cups, have been transferred from the second conveyor 40 to the first conveyor 20 by the transfer unit 44 described hereinabove.

Figure 13:
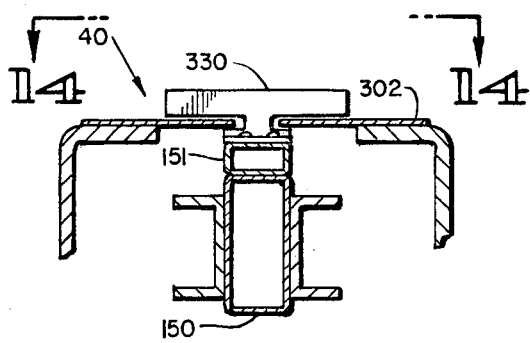
FIG. 13 is a vertical sectional view taken along the line 13—13 of FIG. 10.
Figure 14:
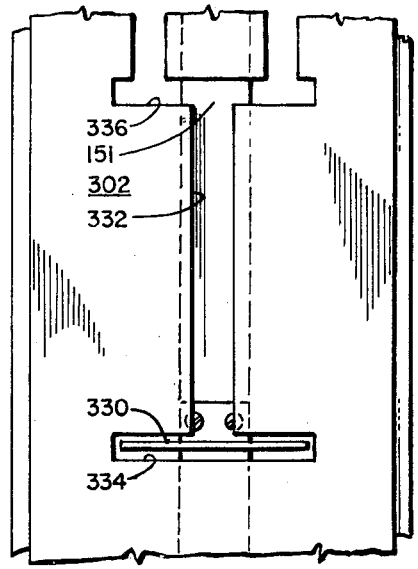
FIG. 14 is a plan view of FIG. 13 being taken along the line 14—14 of that figure.

It is an important feature of the present invention that any articles or cups not transferred by the unit 44 are swept from the deadplate 302 by a sweeper tab 330 best shown in FIG. 13. The sweeper tab 330 comprises an L-shaped bracket having an upstanding or vertical portion which is generally T-shaped, with the stem portion of the T being received in a longitudinally extending slot 332 in the deadplate 302. The lower or horizontally extending portion of the tab 330 is secured to the walking beam 150, and more particularly to the member 151, so that the sweeper tab 330 moves downwardly, from the position shown in FIGS. 10 and 13, through a laterally extending slot 334 provided for this purpose in the deadplate 302, and thence said tab moves rearwardly to the position shown in broken lines in FIG. 10 wherein said sweeper tab 330 is located below the upstream end of the deadplate 302. From this position the sweeper tab 330 is raised upwardly through a laterally extending slot 336 at substantially the same time as the pusher 300 is raised in the manner just described. As the sweeper tab 330 passes beneath the raised stop gate 304, the rotary cam 312 associated with the stop gate causes the gate 304 to lower so as to provide a stop means, or abutment, against which the advancing articles being conveyed across the deadplate 302 are urged by the pusher tab 300. As so constructed the deadplate 302 is cyclically swept clear of any articles, or paper cups, not transferred to the first conveyor 20.

Figure 12:
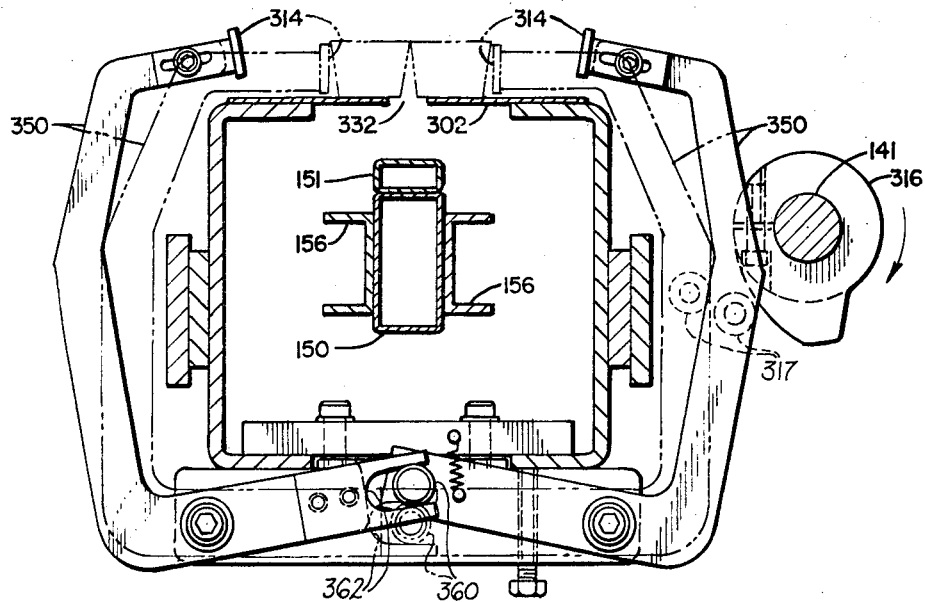
FIG. 12 is a vertical sectional view taken along the line 12—12 of FIG. 10.

Turning next to a more detailed description of the mechanism for moving the pressure plates 314, 314 laterally toward one another in timed relationship with downward movement of the gates 304, and 318, FIG. 12 shows the articles together with their associated cups after they have been compacted laterally by the pressure plates 314, 314. Each of the pressure plates 314 comprises a longitudinally extending shoe which extends downstream from the gate 318 to the stop gate 304. Each pressure plate 314 is adjustably and removably mounted on the free end of a bell crank lever 350, which lever is in turn pivotally supported adjacent its vertex, or corner, in a fixed block 352 which comprises a part of the fixed framework of the second conveyor 40. The block 352 is attached to the lower flanges of the channels 162, 162 by screws 354, 354 which extend through a bar 356 and into the block 352. Two pivot pins 358, 358 are provided in the end portions of the fixed block 352 for pivotally receiving each of the bell cranks 350, 350 respectively.

Preferably, and as shown in FIG. 12, a pin and slot connection is provided between the corresponding inner portion of the lower arms of each of the bell cranks 350, 350 so that as one moves between the solid and broken line position, the other bell crank moves oppositely with respect thereto. As shown in FIG. 12, the right-hand bell crank is provided with a pin 360 which carries a roller, and the roller rides in a slot 362 provided for this purpose in an offset inner portion of the left-hand bell crank. Thus, the cam 316 carried by the continuously driven shaft 141 engages the cam follower roller 317 on the right-hand bell crank 350 to urge the plates 314, 314 laterally inwardly toward one another to compress the articles and associated paper cups laterally at substantially the same time that these articles and cups are being compressed longitudinally by the pusher tab 300.

We claim:

1. An apparatus for placing articles in individual receptacles and for transferring groups of said articles together with their receptacles onto receivers, said apparatus comprising a first conveyor for feeding a plurality of receivers in step-by-step fashion along a horizontal path, a second conveyor alongside said first conveyor for feeding receptacles along a second horizontal path, means for driving both conveyors so that they are mechanically interlocked to move said receivers and receptacles in timed relationship with one another, means for placing said receptacles at predetermined locations on said second conveyor, means for loading articles into certain of said receptacles on said second conveyor, and means for transferring groups of said articles together with their associated receptacles onto said receivers on said first conveyor.

2. An apparatus as defined in claim 1 further characterized by said means for placing said individual article receptacles on said second conveyor comprising at least one magazine for storing a plurality of such receptacles above said second conveyor, means for withdrawing the lower-most article receptacle from said magazine in timed relationship with the step-by-step motion of said second conveyor, and chute means associated with each magazine for guiding each receptacle onto said second conveyor following its withdrawal from said magazine.

3. An apparatus as defined in claim 1 further characterized by means for compacting said receptacles and articles into groups adjacent the downstream end of said second conveyor, said groups being thereby successively configured on said second conveyor so that each such group can be transferred into a receiver by said transferring means.

4. An apparatus as defined in claim 1 further characterized by said first and second conveyors each comprising a fixed framework, a member extending along the path of movement of said receivers and said receptacles respectively, a plurality of pushers connected to each of said members at spaced points along their respective lengths, means slidably supporting each of said members for movement longitudinally of said respective paths, means supporting each of said member supporting means for slidable movement vertically of their respective frameworks, means including a continuously driven rotary cam for simultaneously raising one of said support means while lowering the other support means and for lowering the one while raising the other, two levers each of which is pivotally mounted in one of said fixed frameworks and is drivingly connected with one of said members for moving its associated member longitudinally back and forth in response to oscillations of said levers, two rotary cranks each of which is drivingly connected to an associated lever, and drive means connecting said cranks so that said levers move in opposite directions with respect to one another, said drive means also serving to rotate said cam in timed relationship with said two cranks so that said members move in opposite horizontal directions and then up and down respectively to advance said receivers and receptacles intermittently along their respective paths in timed relationship but out of phase with one another.

5. An apparatus as defined in claim 4 further characterized in that said drive means comprises a chain and sprocket drive connecting said rotary cranks and a chain and sprocket drive connecting said cam with one of said rotary cranks.

6. An apparatus as defined in claim 4 further characterized by said means for placing said individual article receptacles on said second conveyor comprising at least one magazine for storing a plurality of such receptacles above said second conveyor, means for withdrawing the lowermost receptacle from said magazine, chute means associated with each magazine for guiding each receptacle onto said second conveyor following its withdrawal from said magazine, and a chain and sprocket mechanism associated with said crank and cam drive means for operating said receptacle withdrawing means in timed relationship with the intermittent motion of said second conveyor.

7. An apparatus as defined in claim 6 further characterized by means for compacting said receptacles and articles into groups on said second conveyor, said groups being thereby successively configured on said second conveyor so that each such group can be transferred into a receiver by said transferring means.

8. An apparatus a defined in claim 7 further characterized by said means for compacting said receptacles and articles comprising stop means adjacent the downstream end of said second conveyor, which stop means serves to impede the forward movement of each successive group resulting from advancing movement of said pushers, a gate movably mounted above the path of movement of said receptacles, and means for moving said gate downwardly to hold said group in a longitudinally compacted configuration against said stop means following downward movement of said pusher, said means also serving to raise said gate prior to the succeeding advancing movement of said pushers.

9. An apparatus as defined in claim 3 further characterized by said drive means for said first and second conveyors including an oscillating shaft alongside each of said conveyors, means for oscillating each of said shafts through a cyclical back and forth angular displacement in response to movement of its associated conveyors, means connected with said second conveyor associated shaft for driving said article loading means in response to said second shaft oscillations, and means connected with said first conveyor associated shaft for driving said article transferring means in response to said first shaft oscillations.

10. An apparatus as defined in claim 9 further characterized by said means for compacting said receptacles and articles comprising a pair of laterally opposed pressure plates arranged one on each side of said second conveyor adjacent its downstream end, and means for moving said pressure plates cyclically toward and away from one another to compact said receptacles and articles laterally prior to transferring said successive groups onto said receivers on said first conveyor.

11. An apparatus as defined in claim 10 further characterized by a continuously rotating shaft drivingly connected to said means for driving said conveyors, said means for cyclically moving said pressure plates including cam means carried by said continuously rotating shaft, and a cam follower engageable by said cam means for moving said plates in timed relationship with movement of said gate.

12. An apparatus as defined in claim 11 further characterized by said means for cyclically moving said pressure plates further including two bell crank levers pivotally mounted at either side of said second conveyor, said bell crank levers having upstanding arms which carry said plates respectively, said bell crank levers having inwardly extending arms which are connected to one another so that said plates move oppositely, and said cam follower comprising a roller carried by one of said upstanding bell crank lever arms.

13. An apparatus as defined in claim 12 further characterized by said means for cyclically moving said pressure plates further including biasing means for urging said levers and their associated pressure plates outwardly, said cam means serving to move said levers inwardly to compact said receptacles and articles as said shaft rotates.

14. An apparatus as defined in claim 13 further characterized by cam means carried by said continuously rotating shaft for cyclically raising said gate.

15. An apparatus as defined in claim 8 further characterized by said means for compacting said receptacles and articles comprising a pair of transversely opposed pressure plates arranged one on each side of said second conveyor downstream of said gate, cam means carried by at least one of said conveyor associated shaft, two bell crank levers pivotally mounted at either side of said second conveyor and having upstanding arms which carry said plates respectively, said bell crank levers having inwardly extending arms which are connected to one another so that said plates move oppositely, and a cam follower carried by one of said upstanding arms for moving said plates in response to rotation of said continuously driven shaft.

16. An apparatus as defined in claim 15 further characterized in that said stop means comprises a second gate movable from a stop position to a position above said second conveyor, and cam means for moving both gates in sequence so that said second gate stops said articles as aforesaid, and said second conveyor including means for cyclically sweeping any articles and receptacles from between said pressure plates when said second gate is moved upwardly out of said stop position.

17. An apparatus as defined in claim 2 further characterized in that said means for driving both conveyors also drives said means for withdrawing the lowermost article receptacle from said magazine whereby said last-mentioned means operates in timed relationship with the step-by-step motion of said second conveyor.

18. An apparatus as defined in claim 17 further characterized in that said single drive means for said conveyors and said article receptacle withdrawing means includes a continuously driven chain and sprocket mechanism, a continuously driven rotary crank associated with each of said conveyors and driven by said chain and sprocket mechanism, each of said conveyors including an elongated beam member having pushers mounted at spaced points therealong, and lever means driven by said rotary cranks for moving said first and second conveyor beams in respective walking motions to advance said receivers and receptacles therealong as said beams move in one direction and to return said beams for a subsequent pass at said receivers and receptacles, said chain and sprocket mechanism further including a pair of cross shafts disposed respectively above and below said second conveyor beam, said means for withdrawing said receptacles from said magazine comprising an eccentrically mounted crank arm drivingly connected to said upper cross-shaft, and a receptacle engaging finger mounted on said crank arm and movable upwardly into said magazine and downwardly along one side of said magazine to successively withdraw inverted cup-shaped receptacles from said magazine in timed relationship with the step-by-step motion of said second conveyor.

19. An apparatus as defined in claim 18 further characterized by a plurality of such magazines mounted at either side of said second conveyor adjacent the upstream end thereof, each of said magazines extending upwardly and outwardly with respect to the side edges of said second conveyor, two stub shafts rotatably supported below said upper cross-shaft and drivingly connected thereto, each of said stub shafts carrying a radially adjustable eccentric on which is mounted one of said crank arms, each of said crank arms being moveable in a plane perpendicular to the path of movement of said receptacles on said second conveyor, and means for adjustably mounting a plurality of said receptacle engaging fingers on each of said crank arms so that each finger moves upwardly into its associated magazine and downwardly toward said second conveyor to withdraw cup-shaped receptacles therefrom.

20. An apparatus as defined in claim 19 further characterized by restraining means for each of said crank arms, each crank arm being mounted on said eccentric with opposite end portions extending radially outwardly with respect to the axis of rotation of its associates stub shaft, a lower end portion of each crank arm carrying said means for mounting said fingers and an upper end portion of each crank arm connected to said crank arm restraining means to restrict the movement of said lower end portion to substantially upward and downward motion so that said fingers move into and out of said magazines.

21. An apparatus as defined in claim 6 further characterized by said chain and sprocket mechanism including a pair of cross shafts disposed respectively above and below said second conveyor framework, an eccentrically mounted crank arm drivingly connected to said upper cross shaft, and said means for withdrawing a receptacle from said magazine including a receptacle engaging finger mounted on said crank arm and movable upwardly into said magazine and downwardly along one side of said magazine to successively withdraw inverted cup-shaped receptacles from said magazine so that each receptacle is fed by gravity down said chute means onto said second conveyor platform where it is advanced by a pusher as the next succeeding receptacle is being withdrawn from said magazine.

22. An apparatus as defined in claim 21 further characterized by a plurality of such magazines mounted at either side of said second conveyor adjacent the upstream end thereof, each of said magazines extending upwardly and outwardly with respect to the side edges of said second conveyor platform, each of said magazines comprising a channel in which said cup-shaped receptacles are stored in stacked inverted position with the lowermost receptacle held in place by inwardly protruding tabs on the channel flanges.

23. An apparatus as defined in claim 22 further characterized by two stub shafts supported for rotation about parallel axes aligned with the path of movement of said receptacles on said second conveyor, each of said stub shafts being drivingly connected to said upper cross-shaft, a radially adjustable eccentric carried by each of said stub shafts for supporting one of said crank arms for movement in a plane perpendicular to said receptacle path of movement and means for adjustably mounting a plurality of said receptacle engaging fingers on each of said crank arms so that each finger moves upwardly into its associated magazine and downwardly so as to withdraw a cup-shaped receptacle therefrom.

24. An apparatus as defined in claim 23 further characterized by restraining means for each of said crank arms, each crank arm being mounted on its associated eccentric with opposite end portions extending radially outwardly with respect to the axis of rotation of its associated stub shaft, a lower end portion of each crank arm carrying said means for mounting said fingers, said finger mounting means comprising a bar releasably clamped to said crank arm lower end portion and extending parallel to its associated stub shaft and supporting said fingers, and an upper end portion of each crank arm carrying said restraining means, said restraining means comprising a link of adjustable length connecting said crank arm upper end portion to a fixed portion of said second conveyor framework to restrict the movement of said lower end portion so that said fingers move upwardly into their associated magazine channels then move toward the rear walls of said channels and then downwardly so that the lowermost cup-shaped receptacles in said channels are rotated from their inverted positions toward upright positions in said respective chute means.

25. An apparatus for placing individual article receptacles on a walking beam conveyor, said apparatus comprising a fixed conveyor framework having a plurality of side-by-side receptacle paths thereon, a beam extending horizontally in parallel relation to the paths, a plurality of pushers connected to said beam at spaced points along its length, each of said pushers having tabs adapted to extend into said receptacle paths, means slidably supporting said beam for limited longitudinal movement in said horizontal direction, means supporting said beam for limited slidable movement vertically of said framework, means including a continuously driven rotary cam for raising and lowering said beam support means, a lever pivotally mounted in said fixed framework and drivingly connected to said beam for moving said beam longitudinally back and forth in response to oscillation of said lever, a rotary crank drivingly connected to said lever, drive means for rotating said crank and said cam in timed relationship with one another so that said pusher tabs move from initial positions upwardly into the associated paths of movement of said receptacles and then move longitudinally to advance said receptacles in step-by-step fashion along said side-by-side paths, further rotation of said crank and cam serving to lower said pusher tabs out of the associated paths of movement of said receptacles and then to return said pushers to their initial positions, means for placing said receptacles in said paths on said conveyor platform, said last mentioned means comprising a plurality of magazines for storing pluralities of such receptacles above said paths on said conveyor platform, means for withdrawing the lower most receptacle from said magazine in timed relationship with the step-by-step motion of said conveyor, and chute means associated with each magazine for guiding each receptacle onto an associated path on said conveyor following withdrawal from one of said magazines.

26. An apparatus for compacting individual articles and their associated receptacles on a walking beam conveyor, said apparatus comprising a fixed conveyor framework having a plurality of side-by-side paths thereon, a beam extending horizontally in parallel relation to the paths, a plurality of pushers connected to said beam at spaced points along its length, each of said pushers having tabs adapted to extend into said paths, means slidably supporting said beam for limited longitudinal in said horizontal direction, means supporting said beam for limited slidable movement vertically of said framework, means including a continuously driven rotary cam for raising and lowering said beam support means, a lever pivotally mounted in said fixed framework and drivingly connected to said beam for moving said beam longitudinally back and forth in response to oscillation of said lever, a rotary crank drivingly connected to said lever, drive means for rotating said crank and said cam in timed relationship with one another so that said pusher tabs move upwardly from initial positions into the paths on said conveyor and then move longitudinally to advance said receptacles in step-by-step fashion along said side-by-side paths, further rotation of said crank and cam serving to lower said pusher tabs out of said paths and to return said pushers to their initial positions, means for placing receptacles in said paths adjacent an upstream end of said conveyor, means for loading articles into certain of said receptacles, said conveyor drive means including an oscillating shaft alongside said conveyor, means connected with said shaft for driving said article loading means in response to oscillations of said shaft, and means for compacting said receptacles and articles into groups adjecent the downstream end of said conveyor, said last mentioned means including a stop gate on said second conveyor against which said articles and receptacles can accumulate so as to be compacted longitudinally, a first gate movably mounted above said paths on said second conveyor, and means for moving said first gate in timed relationship with movement of said conveyor beam to successively isolate groups of said articles and receivers at the downstream end of said second conveyor.

27. An apparatus as defined in claim 26 further characterized by said means for compacting said receptacles and articles comprising a continuously rotating shaft drivingly connected to said conveyor operating means, a pair of laterally opposed pressure plates arranged one on each side of said conveyor intermediate said stop gate and said first gate, and cam means carried by said continuously rotating shaft for moving said plates cyclically toward and away from one another to compact said receptacles and articles laterally, said means for moving said first gate also comprising cam means carried by said continuously rotating shaft.

28. An apparatus as defined in claim 27 further characterized by said means for placing said receptacles in said paths comprising a plurality of magazines for storing pluralities of such receptacles above said paths on said conveyor platform, means for withdrawing the lowermost receptacles from said magazines in timed relationship with the step-by-step motion of said conveyor, and chute means associated with each magazine for guiding each receptacle onto its associated path.

29. An apparatus as defined in claim 28 further characterized by said means for withdrawing said lowermost receptacles from said magazines comprising a continuously driven chain and sprocket mechanism drivingly connected to said rotating cam and crank, said mechanism including a pair of cross shafts disposed respectively above and below said conveyor, and eccentrically mounted crank arm associated with each of said paths on said conveyor and driven by said upper cross shaft, and a receptacle engaging finger associated with each of said magazines and mounted to said crank arm so as to move upwardly into said magazine and downwardly along one side of said magazine to successively withdraw said receptacles therefrom in timed relationship with the step-by-step motion of said conveyor.

30. An apparatus as defined in claim 29 further characterized by said means for compacting said receptacles and articles comprising a pair of bell crank levers pivotally mounted at either side of said conveyor and having upstanding arms which carry said pressure plates respectively, said bell crank levers having inwardly extending arms which are connected to one another so that said plates move oppositely, a cam follower carried by one of said upstanding arms and engageable with said cam means on said continuously rotating shaft, said stop gate being movable from its stop position upwardly to an inactive position above said second conveyor, and cam means also carried by said continuously rotating shaft for raising both gates in sequence so that said stop gate stops said articles as aforesaid, and said second conveyor including a downstream sweeper tab for cyclically sweeping any articles and receptacles from between said pressure plates when said stop gate is moved upwardly to said inactive position.

References Cited

UNITED STATES PATENTS

| | | | |
|---|---|---|---|
| 2,728,508 | 12/1955 | Marasso | 53—244 |
| 2,886,927 | 5/1959 | Fisk | 53—26 |
| 2,976,659 | 3/1961 | Flanagan | 53—237 |
| 3,001,344 | 9/1961 | Morton. | |
| 3,065,584 | 11/1962 | Coleman | 53—244 X |
| 3,109,531 | 11/1963 | Jackson. | |
| 3,191,357 | 6/1965 | Hawley | 53—240 |
| 3,191,358 | 6/1965 | Scherr | 53—240 |
| 3,225,513 | 12/1965 | Ehe | 53—244 X |
| 3,226,912 | 1/1966 | Raye | 53—240 |
| 3,283,471 | 11/1966 | Thurston | 53—160 X |
| 3,290,859 | 12/1966 | Talbot | 53—160 |
| 3,319,396 | 5/1967 | Hofer | 53—240 |
| 3,344,580 | 10/1967 | Griner | 53—160 |
| 3,389,531 | 6/1968 | Ehe | 53—240 X |
| 3,431,702 | 3/1969 | Spaulding | 53—26 X |

FOREIGN PATENTS 480,403    1/1952    Canada.

WAYNE A. MORSE, JR., Primary Examiner

U.S. Cl. X.R.

53—160, 238, 244, 251, 263